Nov. 10, 1953          A. J. FITZGERALD          2,658,583
STRUCTURAL MEMBER FOR GRILLES AND AIR FILTERS
Filed May 31, 1952          2 Sheets-Sheet 2
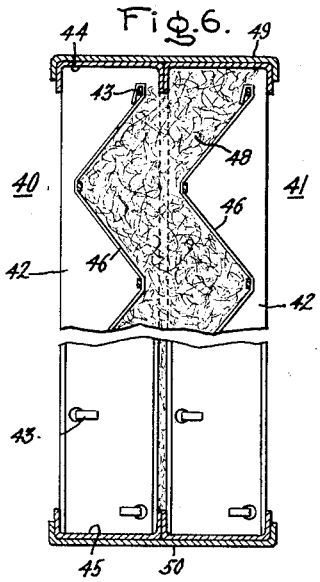
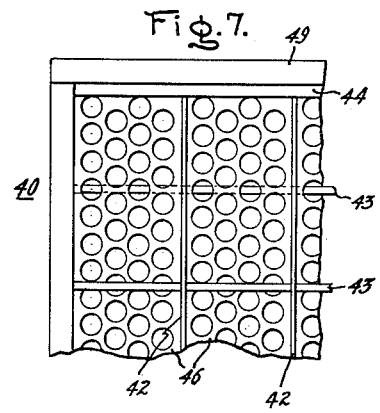
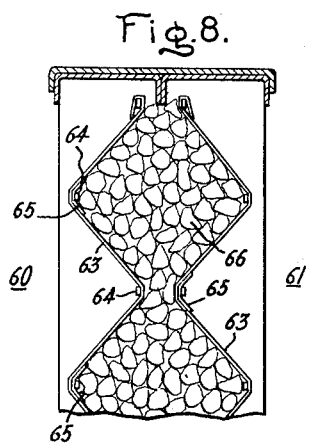
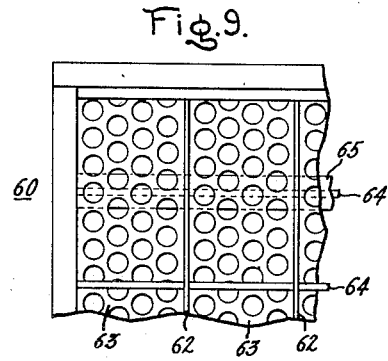
Inventor:
Albert J. Fitzgerald,
by Merton D Morse
His Attorney.

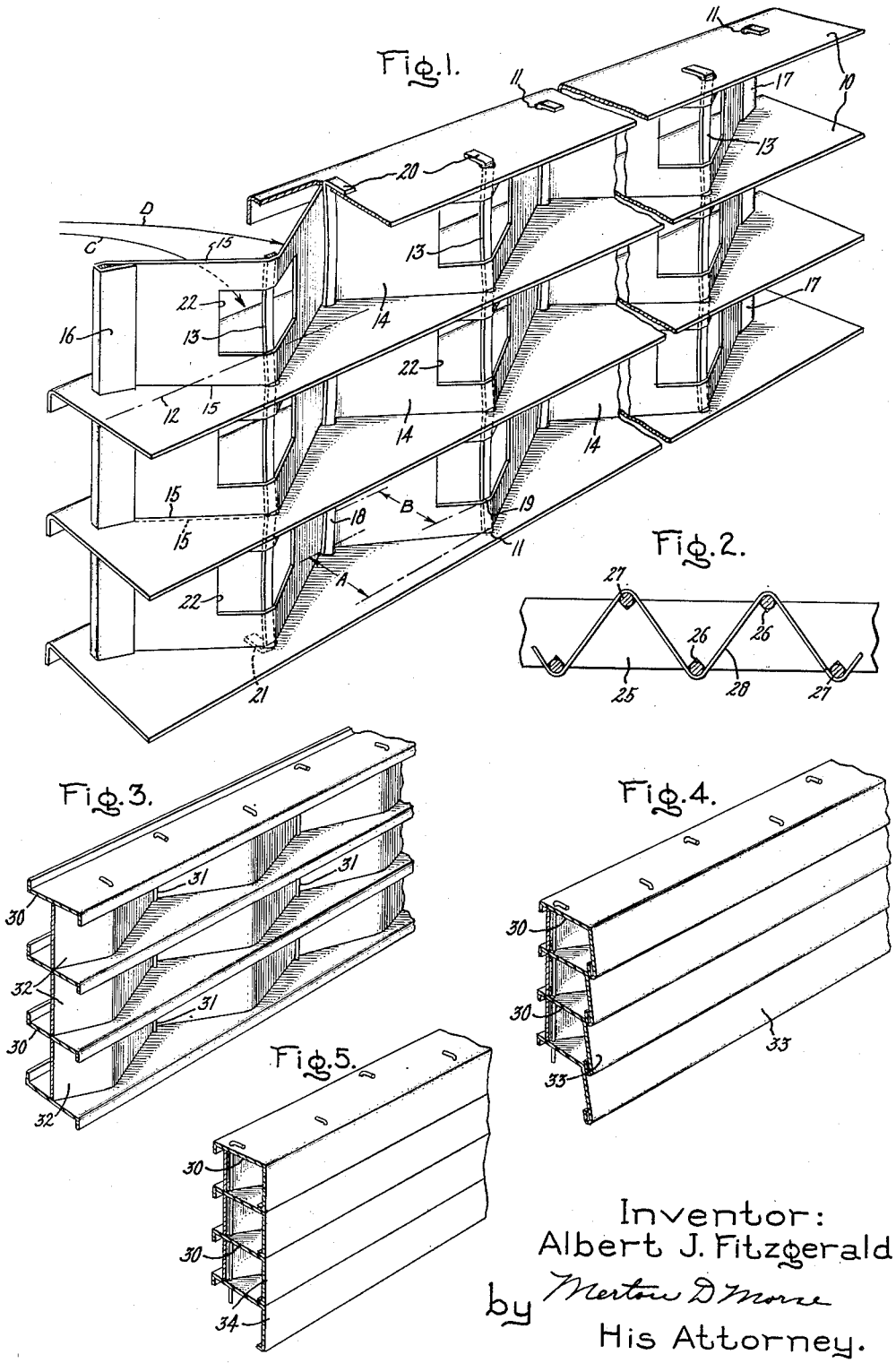

Patented Nov. 10, 1953

2,658,583

UNITED STATES PATENT OFFICE 2,658,583

STRUCTURAL MEMBER FOR GRILLES
AND AIR FILTERS

Albert J. Fitzgerald, Syracuse, N. Y., assignor to General Electric Company, a corporation of New York Application May 31, 1952, Serial No. 290,953

7 Claims. (Cl. 183—45)

My invention relates to structural members and, more particularly, pertains to an improved structure which is suited for use as a decorative grille in an air-admitting opening of a vehicle such as a railroad locomotive. Grilles of this general type are disclosed in my copending application, filed October 11, 1946, bearing the Serial No. 702,823, now Patent No. 2,639,012, dated May 19, 1953, and assigned to the same assignee as the present application which is a continuation-in-part thereof.

It is an object of this invention to provide an improved structural member which is simple and inexpensive to construct and yet is not subject to rattling or chattering when subjected to vibration.

A further object of this invention is to provide an inexpensive structural member having anti-rattle characteristics and attractive enough in appearance to permit its use as a decorative grille for a railroad locomotive.

Yet another object of this invention is to provide an inexpensive structural member which is particularly adapted for use in an air filter.

A structure in accordance with my present invention comprises a plurality of members, such as flat strips, positioned adjacent one another with the surfaces thereof in parallel planes. A plurality of flexible elements, or wires, extend transversely relative to each of these members and are in engagement therewith at points alternately distributed on opposite sides of a line extending over the surface thereof. Thus, the flexible elements are spaced from one another by a given distance. A spacer is disposed in woven relation with respect to the flexible wires and includes one pair of contact portions engaging opposed surfaces of the flat strips to maintain a predetermined spacing therebetween. The spacer further includes another pair of contact portions engaging a successive pair of the flexible elements. The latter contact portions are spaced by a distance other than the aforesaid given distance so as to maintain the flexible elements in a flexed condition and in firm engagement with the members at the contact points. Preferably, the spacer is in the form of a flat, flexible strip, woven with respect to the flexible wires and maintained under tension, thereby to produce flexing of the wires.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which:

Fig. 1 is a perspective representation of a portion of a structural member, viewed from a point rearwardly thereof, constructed in accordance with my invention and which is suitable for use as a decorative grille;

Fig. 2 is a sectional view of a modification of the structure shown in Fig. 1;

Fig. 3 is a frontal perspective view of a portion of a structural member, similar to the one shown in Fig. 1, but featuring an alternative construction;

Figs. 4 and 5 represent modifications of the arrangement shown in Fig. 3;

Fig. 6 is an end view of a portion of an assembly incorporating a pair of structural members embodying my invention and adapted for use as an air filter;

Fig. 7 is a fragmentary plan view of a section of one of the structural members shown in Fig. 6; and Figs. 8 and 9 represent a modification of the assembly shown in Figs. 6 and 7.

Referring now to Fig. 1 of the drawings, the structural member constructed in accordance with my invention is shown to comprise a plurality of longitudinal members or flat strips 10 positioned adjacent one another with their surfaces in spaced, parallel planes. The strips 10 are provided with downwardly turned front-edge portions 9 disposed in a transverse plane for improving the appearance of the grille structure.

Each of the strips 10 includes a series of openings 11 which are alternately distributed on opposite sides of a longitudinal line 12 extending along the strip's surface, parallel to an edge thereof. The openings in the several strips are identically disposed and, hence, corresponding openings in the strips are aligned with one another. Each of these corresponding openings receives an individual one of a plurality of flexible wires 13 which extend transversely of the parallel strips 10. Thus, insofar as each strip is concerned, its openings 11 determine a spacing for the transverse wires 13. For example, one pair of wires may be spaced from one another in a direction perpendicular to line 12 by a distance A, represented at the upper surface of the next lowermost one of members 10. In this particular illustrative embodiment of my invention, distance A is characteristic of the spacing for each successive pair of the wires 13. However, it is to be understood that the spacing between successive wires need not be constant.

The structure further includes an individual, thin, flexible spacer-strip 14 disposed between each adjacent pair of longitudinal strips 10 in woven relation with respect to the flexible wires 13. The upper and lower or opposite edges 15 of each spacer strip 14 constitute one pair of contact portions engaging opposed surfaces of the longitudinal strips thereby to maintain a predetermined spacing therebetween.

Each of the spacers 14 is placed under tension during the assembly process for the structural member, and its extremities 16 and 17 are bent or hooked around the end pair of the array of transverse wires 13. Thus, each spacer-strip 14 is maintained under tension and portions of its flat surfaces engage the transverse wires. For example, the portions designated 18 and 19 of one of the spacers, engage the outer portions of a pair of successive transverse wires and because of the spacer tension, portions 18 and 19 are spaced by a distance B which is shorter than the distance A. This distance relationship is produced for each successive pair of transverse wires and thus, each wire is flexed or bowed and maintained in firm engagement with a portion of the periphery of each of corresponding ones of openings 11 through which it passes. The bowing of wires 13 has been exaggerated in the structure of Fig. 1 in order to illustrate this characteristic clearly.

The upper extremity of each of wires 13 is bent over at 20, after passing through an opening in the upper one of longitudinal members 10 and the lower extremity of each wire is similarly bent over at 21 so that movement of the wires 13 is limited to flexing. The lengths of the wires are arranged so that when they are flexed or bowed due to the tension in spacer strips 14, the upper and lower longitudinal members 10 are drawn toward one another with the intermediate spacers and longitudinal members serving to limit movement. As a result, adjacent longitudinal strips are maintained in firm engagement with edges 15 of the interposed one of spacers 14.

In order to adapt the structure of Fig. 1 for use as a locomotive grille, rectangular openings 22 are provided in each spacer in the vicinity of alternate ones of transverse wires 14. More specifically, the openings 22 are positioned in the portions of spacers 14 disposed innermost relative to the locomotive cab in which the structure of Fig. 1 is mounted. These air-admitting openings extend along the spacer for but a portion of the distance between successive wires 13 so that a dirt-separating action may occur when the locomotive carrying the structure of Fig. 1 travels in a direction parallel to line 12. In particular, substantially only air, which is of considerably smaller mass than foreign particles such as dirt, follows path C through opening 22 into the interior of the locomotive. However, the dirt tends to follow path D and impinge upon the outer surface of the spacer from which it may be deflected to the outside of the locomotive cab. This may occur in a manner similar to that described in my copending application filed March 28, 1952, bearing the Serial No. 279,189, and assigned to the present assignee.

The tension of spacer-strips 14 maintains the afore-mentioned firm engagement between each adjacent pair of longitudinal strips and the edges 15 of the interposed one of the spacers. Furthermore, flexing or bowing of the wires 13 effects discontinuities at the points of engagement with each of the longitudinal strips, that is in the vicinity of each of the openings 11, which further operate to inhibit movement of the longitudinal strips. The structure is thus maintained in a locked assembly and although the several elements 10, 13 and 14 may be constructed of metal, the assembly is free of rattling or chattering when subjected to vibration. This, of course, is a most desirable characteristic for a structural member mounted in a railroad locomotive.

Since the openings 11 through which wires 13 pass are distributed alternately on opposite sides of line 12, it is evident that the spacer strips must be woven in zig-zag fashion. Hence, the contact surfaces between the longitudinal strips and the edges 15 of the spacers effectively extend in a direction transverse to line 12. This spacing, essentially by distance A, is considerably greater than would be afforded in a structure having openings for a similar purpose distributed along a straight line. Thus, the structure embodying my invention is considerably stronger than such a straight-line arrangement.

From an inspection of Fig. 1, it is apparent that the structure constructed in accordance with my invention is comprised of elements which are simple in form and which require no special manufacturing techniques. These elements are easily assembled into a complete structure and consequently the structural member embodying my invention is inexpensive to construct.

Moreover, because no disfiguring joining processes, such as welding, need be employed, the elements of the structure may be treated prior to assembly, as by plating, to effect pleasingly-finished surfaces. As a result, a considerably less expense is involved than in finishing the surfaces of a completed structure. The appearance of the grille structure, both as to finish as well as to the arrangement of elements, thus is attractive enough to permit its use as a decorative grille for vehicles, such as railroad locomotives.

Although a structure has been shown and described in which the longitudinal members 10 are provided with alternately distributed openings 11 for transverse wires 13, various other arrangements may be employed. For example, as shown in Fig. 2, longitudinal members 25 may be employed in which V-shaped notches 26 are cut in the edges at positions corresponding to the openings 11. Of course, notches of other configurations may suitably be employed. Transverse wires 27 are seated in notches 26 and a spacer strip 28 is positioned and woven in a manner similar to that described in connection with spacer strip 14 of Fig. 1. Spacer strip 28 serves to maintain the several wires 27 in their respective ones of notches 26 as well as to produce flexing of the wires.

Referring now to Fig. 3, the structural member there illustrated is similar in many respects to the one represented in Fig. 1. It comprises longitudinal elements 30 provided with alternately disposed openings through which transverse wires 31 pass. The transverse strands 31, of course, are bent over against the outer or top and bottom longitudinal elements 30 and are thus maintained under tension. A plurality of spacers 32, corresponding to spacers 14 of Fig. 1, are formed of resilient material. Spacers 32, prior to assembly of the structure, are essentially straight or nearly flat and in the assembly process they are woven back and forth through transverse strands 31 and thus impart a lateral force against the wires. The wires are thereby bowed or flexed into biased engagement at the points of contacts with the peripheries of the openings through which they pass. The flexing of transverse strands 31 draws the upper and lower longitudinal elements 30 toward one another and a rigid, rattle-free structure is effected. As in the structure of Fig. 1, flexing of transverse strands 31 produces discontinuities therealong which assist in inhibiting movement of the several elements of the structure.

The structural members shown in Figs. 4 and 5 are similar to that of Fig. 3, differing only in the cross-sectional shape of the longitudinal members or strips. Members 30 of Fig. 4 are provided with extensions 33 which close the gaps between adjacent ones of the longitudinal strips. The configuration of extensions 33 is such that the face of the structural member of Fig. 4 is similar to that of a clapboard wall construction, and the member could be used as a wall in building construction. Since it is strong and light, it is ideally suited for prefabrication while readily constructed to simulate a wooden structure.

In Fig. 5, extensions 34 are provided for longitudinal elements 30 which effect a flat continuous face for the structural member. The structural member thus is suitable for numerous applications, including the construction of floors, walls, or doors of buildings or wherever a strong, light, rattle-proof, flat, metal or plastic member is desired.

Referring now to Fig. 6, there is shown an assembly of a pair of structures 40 and 41 incorporated in an air filter. Structures 40 and 41 are of identical construction and each embodies my invention. As shown in Fig. 7, structure 40, for example, comprises a plurality of strip-like members 42 disposed with their flat surfaces parallel to one another and having openings which receive transversely extending wires 43. Elements 42 and 43 correspond to elements 10 and 13 of Fig. 1. The end pair of elements 43 are of channel cross-section and are joined at their extremities by another pair of channel members 44, 45 to form a rectangular box. Perforated spacer members 46, which correspond to spacers 14 of Fig. 1, are interposed between successive ones of members 42 and are maintained under tension by being wrapped around the end pair of wires 43. As best shown in Fig. 7, members 46 are composed of flat strips of metal provided witht a pattern of perforations.

A body of metallic fibers, such as copper wool, is sandwiched between members 40 and 41 effectively to fill the spaces between adjacent spacer members of the structures 40 and 41. A pair of clips 49 and 50 maintain members 40 and 41 in a unitary, locked assembly.

In operation as an air filter, the assembly 40—41 is suitably positioned in an air duct and incident air passes through the openings of members 46 of structure 40 and into fibrous material 48. Material 48 retains foreign particles while permitting the air to pass therethrough and out of the openings in the spacers 46 of member 41.

Since each of members 40 and 41 are constructed in accordance with my present invention, the filter assembly does not rattle or otherwise chatter when subjected to vibration. Thus, in addition to the freedom from the annoying effects of rattle, dirt particles entrapped in fibrous material 48 are not shaken loose and the fibrous material itself is not packed down, such as might occur due to vibration-induced movement of the several component elements.

In order to clean the air filter shown in Figs. 6 and 7, clamps 49 and 50 are removed and structural members 40 and 41 separated. Fibrous material 48 then may be removed and cleansed or discarded and replaced by fresh material. It is thus apparent that by employing structures constructed in accordance with my present invention, an air filter is provided which features rapid and inexpensive renewal of the filter element subjected to contamination.

If it is desired to minimize turbulence in the air stream emanating from an air filter embodying my invention, the sections 40 and 41 may be rotated ninety degrees relative to one another from the positions shown in Fig. 6. Parallel strips 42 of element 40 thus are transversely disposed with respect to strips 42 of element 41 and the familiar "egg-crate" type of air-straightener is effected, the operation of which is generally well understood.

It is possible to utilize one of the elements 40 or 41 as an air filter by applying thereto, such as by dipping, a coating of dirt-catching oil. The openings in members 46 permit the passage of air while a substantial quantity of dirt is captured by the oil coating. The operation of such an impingement-type filter is generally well understood and hence, a further discussion is deemed unnecessary.

In the modified arrangement of Figs. 8 and 9, a pair of elements 60 and 61, which correspond to sections 40 and 41 of Fig. 6, individually include longitudinal, parallel strips and perforated flexible spacers 63. As in Fig. 6, the spacers are woven relative to transverse, flexible wires 64 and are tensioned to produce flexing of the wires.

Each of the elements 60 and 61 includes a plurality of V-shaped air-deflecting members 65 having a dimension corresponding to the spacing between strips 62. The air-deflecting members 65 are interposed between selected ones of wires 64 and spacers 63 and their V-shape conforms to the zig-zag configuration of the spacers. The orientation of members 60 and 61 and the distribution of the air-deflecting members is such that, when viewed from the left in Fig. 8, the air-deflecting members of section 61 alternate with those of section 60.

The air-deflecting members serve to increase turbulence within the air filter and a mass of oil-dipped pellets 66 disposed between the sections 60 and 61 are better able to perform a filtering action. Of course, in place of separate air-deflecting members, the perforations in spacers 63 may be arranged to provide corresponding imperforate surfaces for this purpose.

While I have shown particular embodiments of the present invention, it will be obvious to those skilled in the art that changes and modifications may be made without departing from this invention in its broader aspects and, therefore, the aim of the appended claims is to cover all such changes and modifications.

What I claim as new and desire to secure by Letters Patent of the United States is:

1. In combination, a plurality of members positioned adjacent one another and having surfaces in parallel planes, a plurality of flexible elements extending transversely relative to each of said members and in engagement therewith at points distributed alternately on opposite sides of a line extending over the surface thereof thereby spacing said elements by a given distance, and a spacer disposed in woven relation with respect to said flexible members, including one pair of contact portions engaging opposed surfaces of said members and maintaining a predetermined spacing therebetween and including another pair of contact portions engaging a successive pair of said flexible elements and having a spacing other than said given distance thereby maintaining said elements in a flexed condition and in firm engagement with said members at said points.

2. In combination, a plurality of elongated members positioned adjacent one another, having surfaces in parallel planes, and having similarly aligned apertures distributed alternately on opposite sides of a longitudinal line of each of said surfaces, a plurality of flexible elements extending transversely through corresponding ones of said apertures and being spaced thereby from one another by a given distance, and a spacer disposed in woven relation with respect to said flexible members, including one pair of contact portions engaging opposed surfaces of said members and maintaining a predetermined spacing therebetween and including another pair of contact portions engaging a successive pair of said flexible elements and having a spacing other than said given distance thereby maintaining said elements in a flexed condition and in firm engagement with said members at said points.

3. In combination, a plurality of members positioned adjacent one another and having surfaces in parallel planes, a plurality of flexible elements extending transversely relative to each of said members and in engagement therewith at points distributed alternately on opposite sides of a line extending over the surface thereof thereby spacing said elements by a given distance, a spacer disposed in woven relation with respect to said flexible members, including one pair of contact portions engaging opposed surfaces of said members and maintaining a predetermined spacing therebetween and including another pair of contact portions engaging a successive pair of said flexible elements, and means for maintaining said other contact portions at a spacing other than said given distance thereby maintaining said elements in a flexed condition and in firm engagement with said members at said points.

4. In combination, a plurality of members positioned adjacent one another and having surfaces in parallel planes, a plurality of flexible elements extending transversely relative to each of said members and in engagement therewith at points over the surface thereof thereby spacing said elements by a given distance, and a thin, flexible spacer strip disposed in woven relation with respect to said flexible members and including opposite edges in engagement with opposed surfaces of said members thereby maintaining a predetermined spacing therebetween, and means for maintaining said spacer-strip under longitudinal tension to maintain portions of the surfaces thereof in engagement with said flexible elements, successive pairs of said portions having a spacing other than said given distance thereby to maintain said flexible elements in a flexed condition and in firm engagement with said members at said points.

5. In combination, a plurality of flat, strip-like members positioned parallel to and adjacent one another, a plurality of flexible wire-like elements extending transversely relative to each of said members, having inner surfaces in engagement with said members at points distributed alternately on opposite sides of a line extending longitudinally over a surface thereof thereby spacing said elements by a given distance and having outer surfaces, and a thin, flexible spacer-strip disposed in woven relation with respect to said flexible members and in engagement with opposed surfaces of a pair of adjacent ones of said members thereby maintaining a predetermined spacing therebetween, and means for maintaining said spacer-strip under longitudinal tension thereby maintaining portions of said strip in engagement with said outer surfaces of said flexible elements whereby successive ones of said portions of said spacer-strip having a spacing other than said given distance thereby maintaining said flexible elements in a flexed condition and in firm engagement with members at said points.

6. In an air filter, a pair of adjacent structural members each comprising, a plurality of members positioned adjacent one another and having surfaces in parallel planes, a plurality of flexible elements extending transversely relative to each of said members and in engagement therewith at points distributed alternately on opposite sides of a line extending over the surface thereof thereby spacing said elements by a given distance, and a perforated spacer disposed in woven relation with respect to said flexible members, including one pair of contact portions engaging opposed surfaces of said members and maintaining a predetermined spacing therebetween and including another pair of contact portions engaging a successive pair of said flexible elements and having a spacing other than said given distance thereby maintaining said elements in a flexed condition and in firm engagement with said members at said points, and said filter further including a filter material interposed between said structural members.

7. In an air filter, a pair of adjacent structural members each comprising, a plurality of members positioned adjacent one another and having surfaces in parallel planes, a plurality of flexible elements extending transversely relative to each of said members and in engagement therewith at points distributed alternately on opposite sides of a line extending over the surface thereof thereby spacing said elements by a given distance, and a perforated spacer disposed in woven relation with respect to said flexible members, including one pair of contact portions engaging opposed surfaces of said members and maintaining a predetermined spacing therebetween and including another pair of contact portions engaging a succesive pair of said flexible elements and having a spacing other than said given distance thereby maintaining said elements in a flexed condition and in firm engagement with said members at said points, and said filter further including a filter material interposed between said structural members, selected portions of said spacer in at least one of said structural members being effectively imperforate to effect turbulence of air passing through said filter material.

ALBERT J. FITZGERALD.

References Cited in the file of this patent

UNITED STATES PATENTS

| Number | Name | Date |
|---|---|---|
| 1,109,059 | Glassford | Sept. 1, 1914 |
| 1,743,675 | Jordahl | Jan. 14, 1930 |
| 1,832,281 | Davis | Nov. 17, 1931 |
| 2,071,806 | Walker | Feb. 23, 1937 |
| 2,074,294 | Woodruff | Mar. 16, 1937 |

FOREIGN PATENTS

| Number | Country | Date |
|---|---|---|
| 1,997 | Great Britain | of 1888 |